(12) United States Patent
Daudi

(10) Patent No.: US 6,216,829 B1
(45) Date of Patent: Apr. 17, 2001

(54) ROTOR WITH TUBULAR VENT DUCTS

(75) Inventor: Anwar R. Daudi, Ann Arbor, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/224,738

(22) Filed: Dec. 31, 1998

(51) Int. Cl.[7] .................... F16D 65/847; F16D 65/12
(52) U.S. Cl. .................. 188/218 XL; 29/527.16; 188/71.6; 188/264 AA
(58) Field of Search ............... 188/264 AA, 71.6, 188/218 XL, 264 A, 73.2, 18 A, 58–59; 192/113.26, 70.12, 113.21, 113.22, 113.23, 113.31; 301/6.3, 6.4, 6.8; 310/93, 77, 58; 164/10, 95, 98, 111, 112, 134, 358, 137, 339, 369; 29/527.6, 557, 434

(56) References Cited

U.S. PATENT DOCUMENTS

| | | |
|---|---|---|
| 2,197,232 | 4/1940 | Wood . |
| 2,772,756 | 12/1956 | Hector et al. . |
| 2,844,855 * | 7/1958 | Gadd et al. . |
| 3,486,218 | 12/1969 | Buyze . |
| 3,592,297 * | 7/1971 | Leffert .................... 188/71.6 |
| 3,592,298 * | 7/1971 | Leffert .................... 188/71.6 |
| 3,651,895 * | 3/1972 | Whitfield .................... 188/71.6 |
| 4,164,993 * | 8/1979 | Kobelt .................... 188/218 XL |
| 4,379,501 * | 4/1983 | Hagiwara et al. .............. 188/218 XL |
| 4,469,203 | 9/1984 | Herbulot et al. . |
| 4,523,666 * | 6/1985 | Murray .................... 188/218 XL |
| 4,665,969 * | 5/1987 | Horst et al. . |
| 4,757,883 | 7/1988 | Thiel et al. . |
| 5,107,966 | 4/1992 | Metzler et al. . |
| 5,224,572 | 7/1993 | Smolen, Jr. et al. . |
| 5,394,963 * | 3/1995 | Deane et al. .................... 188/71.6 |
| 5,544,726 | 8/1996 | Topouzian et al. . |
| 5,706,915 | 1/1998 | Shimazu et al. . |
| 5,915,747 * | 6/1999 | Dickerson et al. .............. 188/218 XL |
| 6,119,820 * | 9/2000 | Steptoe et al. .................... 188/71.6 |

FOREIGN PATENT DOCUMENTS

| | | | |
|---|---|---|---|
| 2748824 * | 5/1979 | (DE) . | |
| 3007240 * | 9/1981 | (DE) . | |
| 3539640 * | 10/1986 | (DE) . | |
| 3800502 * | 1/1989 | (DE) . | |
| 3908655 * | 9/1990 | (DE) . | |
| 0521754 * | 6/1992 | (EP) . | |
| 47-24064 * | 7/1972 | (JP) . | |
| 404039148 * | 2/1992 | (JP) .................... 188/264 AA |

* cited by examiner

Primary Examiner—Douglas C. Butler
(74) Attorney, Agent, or Firm—Marshall & Melhorn, LLC

(57) ABSTRACT

The present invention discloses a vented brake rotor having tubular ducts. The rotor includes universal rotor blank having a hat section and a peripheral section radially extending therefrom. The hat section includes a mounting face and hat wall extending from the periphery of the mounting face. The peripheral section includes a first and a second braking plate joined together in a parallel, spaced apart relationship by a plurality of spacers. A plurality of duct tubes are fastened to the inner surfaces of the braking plates. Each one of the duct tubes has an inlet and an outlet allowing air to flow through the duct tube to provide an airflow path between the braking plates for cooling the rotor. In an alternate embodiment, the present invention may include a plurality of fins fastened to the inner surfaces of the braking plates. The fins extend between the braking plates forming a passages between them. A plurality of duct tubes are fastened in the passages between the fins.

18 Claims, 4 Drawing Sheets

ROTOR WITH TUBULAR VENT DUCTS

BACKGROUND OF INVENTION

The present invention relates to a vehicle brake rotor and more specifically to a vented brake rotor having tubular vent ducts.

Wheeled vehicles are typically slowed and stopped with a braking system that generates frictional forces. One known braking system is the disc braking system which includes a rotor attached to one or more of the vehicle wheels for rotation therewith. The rotor has an annular peripheral section having a pair of outwardly facing annular friction surfaces also known as the braking surfaces.

The disc brake system also includes a caliper assembly secured to a non-rotating component of the vehicle, such as the vehicle frame. The caliper assembly includes a pair of brake pads, each having a backing plate and brake lining material attached thereto. A pad is disposed adjacent each braking surface such that the brake lining material is adjacent the braking surface. The caliper assembly conventionally includes at least one moveable piston operatively connected to the backing plate of at least one of the brake pads. When the driver brakes the vehicle, hydraulic or pneumatic forces move the piston which clamps the brake lining material of the pads against the braking plates of the rotating rotor. As the pads press against the moving rotor braking surfaces, frictional forces are created which oppose the rotation of the wheels and slow the vehicle.

The friction created by the disc brake system causes the rotor temperature to rise. An excessive temperature rise is undesirable since it may deform the rotor and degrade braking performance.

To improve the performance and wear characteristics of the disc brake system, it is desirable to dissipate the heat generated during braking. Vented rotors dissipate heat using a plurality of air passages formed through the peripheral section. For example, some vented rotors include a peripheral section having a pair of annular braking plates. Spacers, such as posts, connect the braking plates together in a mutually parallel, spaced apart relationship. Radial passages or vents are defined between the braking plates and the spacers. Air circulates through the passages as the rotor turns, passing across the inner surfaces of the braking plates and the surfaces of the spacers. The moving air absorbs the heat and removes it from the rotor as it exits the passages.

The cooling effectiveness of the vented rotor depends in part on the quantity of air moved through the passages. A higher airflow rate through the passages dissipates more heat from the rotor. Therefore, it is desirable to move as much air as possible through the passages as the rotor turns.

It is known that the shape, spacing and orientation of the spacers can affect the airflow rate through the passages. For example, fins may be used as spacers which extend along the inner surfaces of the braking plates to a greater extent than the posts creating shaped passages between the fins. The shape of the passages determines the airflow rate through the passages.

Rotors are commonly manufactured by known casting methods during which the shape and orientation of the spacers are fixed. If a different configuration of spacers and passages is desired, a new rotor had to cast. It is desirable to manufacture a rotor providing more flexibility for determining the shape and configuration of the rotor passages without the need to recast the entire rotor.

SUMMARY OF THE INVENTION

The present invention relates to an improved vented brake rotor having tubular ducts and method of producing the same. The rotor includes a universal rotor blank consisting of a peripheral section radially extending from a central hat section. The hat section includes a mounting face and a hat wall extending generally axially therefrom. The peripheral section of the universal rotor blank includes first and second braking plates joined together in a mutually parallel, spaced apart relationship by a plurality of spacers. At least one of the braking plates extends from the hat section. The braking plates include inwardly facing inner surfaces and outwardly facing braking surfaces.

The rotor further includes a plurality of duct tubes disposed between the inner surfaces of the braking plates of the universal rotor blank. The duct tubes include inlets disposed at the radially inner ends of the tubes, and outlets disposed at the radially outer ends of the tubes providing for the passage of cooling air through the duct tubes when the rotor turns. The shape and configuration of the duct tubes determine the airflow rate between the braking plates, and thus the cooling effectiveness of the vented rotor. The duct tubes are fastened to the universal rotor blank with welds, adhesives, or any other suitable manner. The airflow characteristics of between the braking plates of the universal rotor blank can be changed without changing the universal rotor blank castings by using different duct tubes between the braking plates. This invention provides a greater degree of flexibility by using a universal rotor blank for which the desired airflow characteristics can be achieved with a specific shape and configuration of duct tubes. The duct material, configurations and cross sectional shapes can be changed to adjust the airflow characteristics and the efficiency of the heat transfer from the rotor brake plates to the air.

The method for producing the vented disc brake rotor comprises the steps of initially casting the universal rotor blank including a central hat section and peripheral section extending radially therefrom, and fastening tubular ducts between the braking plates of the peripheral section for providing a flow path for cooling air to move between the braking plates when the rotor turns.

Other advantages of this invention will become apparent to those skilled in the art from the following detailed description of the preferred embodiments, when read in light of the accompanying drawings.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE PREFERRED EMBODIMENTS

It is to be understood that the specific devices and processes illustrated in the attached drawings, and described in the following description are simply exemplary embodiments of the inventive concepts defined in the appended claims. Hence, specific dimensions and other physical characteristics relating to the embodiments disclosed herein should not be considered as limiting, unless the claims expressly state otherwise.

Figure 1:
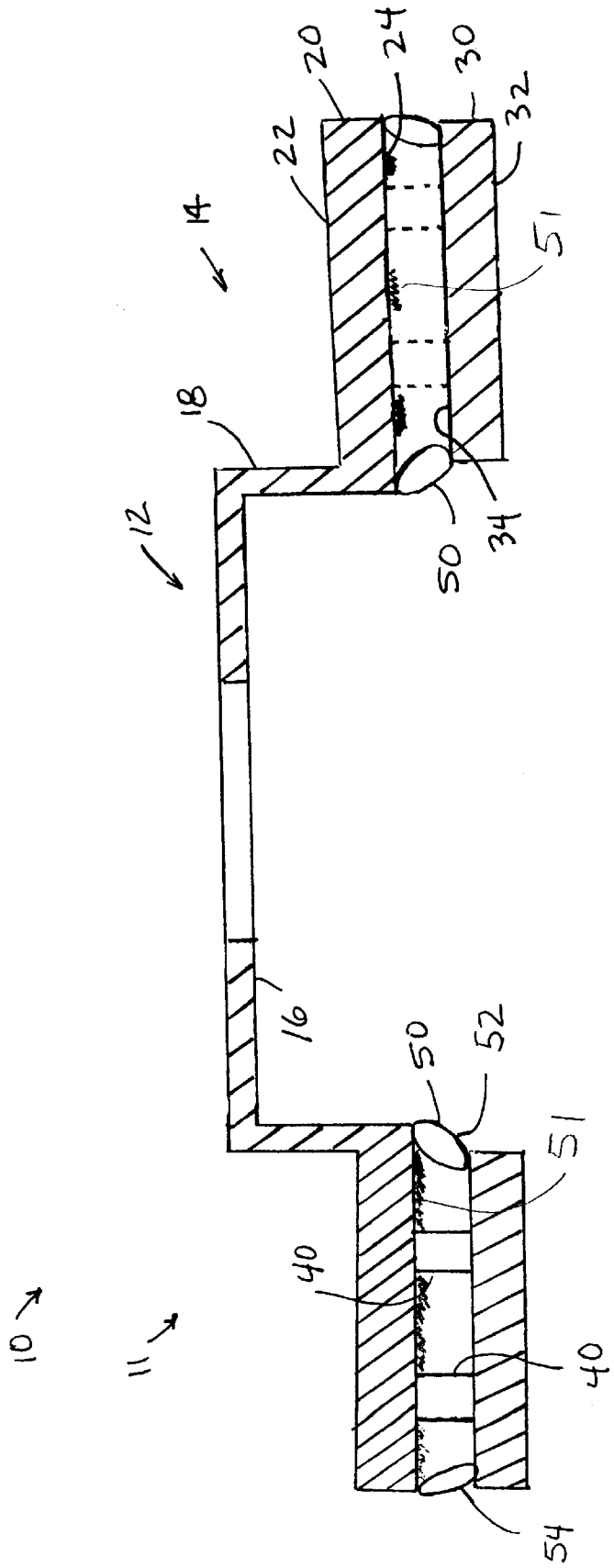
FIG. 1 is a top view of a vented brake rotor in accordance with the present invention.

Referring now to FIG. 1, a rotor embodying the present invention and designated generally with the reference numeral 10 is illustrated. The rotor 10 is of the type adapted for use in conjunction with a variety of braking devices, especially vehicle disc brake braking systems and the like.

The rotor 10 includes a universal rotor blank 11 having hat section 12 and a radially outer peripheral section 14. The hat section 12 includes a mounting face 16 for mounting the rotor 10 on an associated drive member (not shown), such as a spindle or vehicle axle. The hat section further includes a hat wall 18 extending axially from the mounting face 16. The hat wall 18 is preferably generally cylindrical, although alternatively it may be curved or angled to form a portion of a cone.

The peripheral section 14 of the universal rotor blank 11 includes an angular first braking plate 20 extending radially outwards from the hat wall 18 opposite the mounting face 16. The first braking plate 20 is preferably formed integrally with the hat wall 18, although alternatively, it may be attached to the hat section 12 by any known technique. The first braking plate 20 includes an outer braking surface 22, and an inner surface 24.

The peripheral section 14 of the universal rotor blank 11 further includes a second braking plate 30 disposed in a parallel, spaced apart relationship to the first braking plate 20. The second braking plate 30 includes an outer braking surface 32 similar to the braking surface 22 of the first braking plate 20, and an inner surface 34 facing the inner surface 24 of the first braking plate. A caliper assembly and brake pad (not shown) engages the braking surface 22 of the first braking plate 20 to slow or stop the vehicle.

Figure 2:
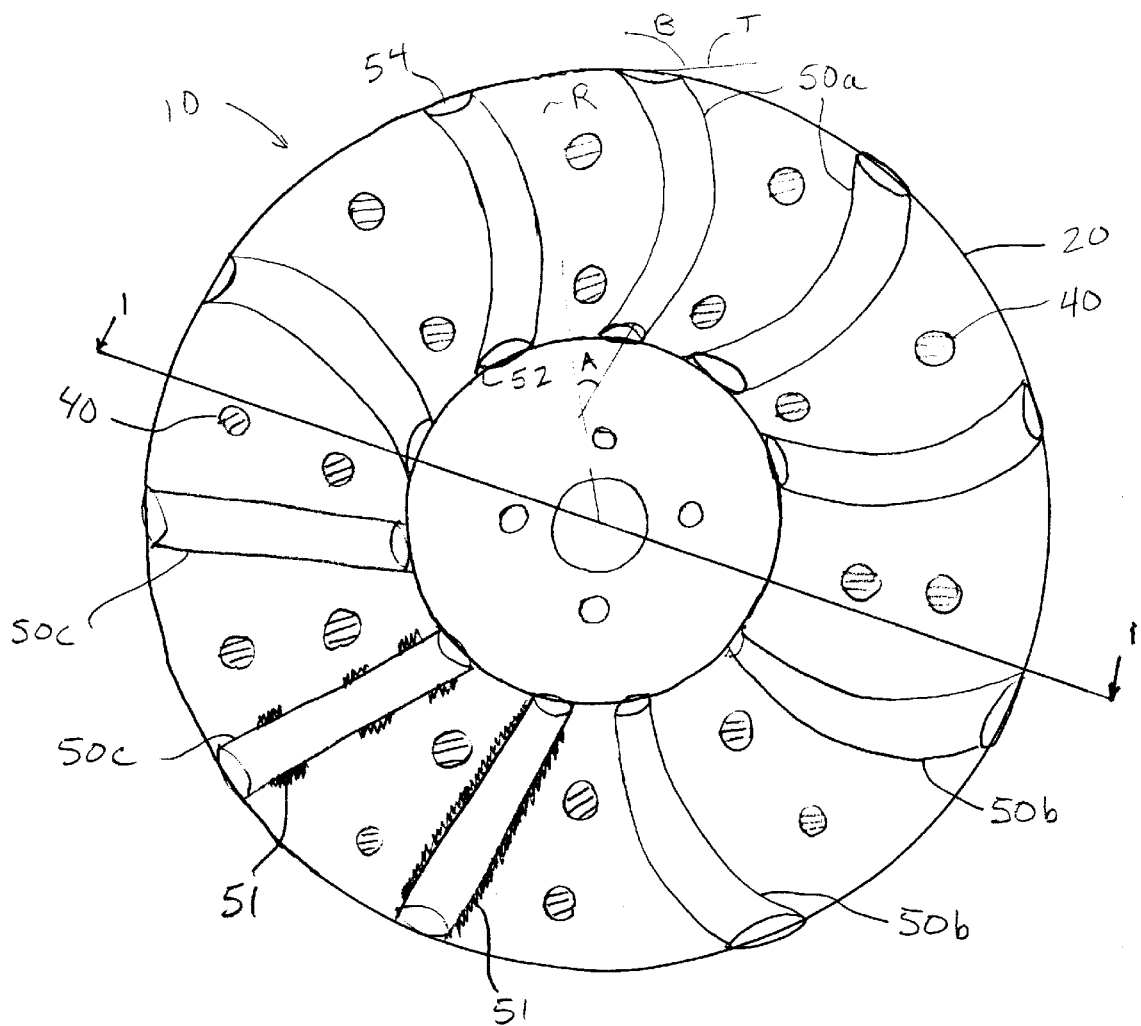
FIG. 2 is an elevational cross sectional view along line 2—2 of FIG. 1 of a duct tube in accordance with the invention.

The universal rotor blank 11 further includes a plurality of spacers 40 extending between the inner surfaces 24 and 34 of the braking plates 20 and 30 to connect the braking plates together. The spacers 40 are preferably posts having a circular cross section as viewed in FIG. 1, although they may have a square, rectangular, oval or any other suitable cross sectional shape. The spacers 40 are preferably spaced in a predetermined configuration around the entire circumference of the annular braking plates 20 and 30. Although the spacers 40 are shown in FIG. 2 as grouped in pairs of two radially aligned spacers, the this configuration is not required to practice this invention. The spacers may be oriented in any desired configuration to practice this invention.

The universal rotor blank 11 is preferably cast using a known casting process. The universal rotor blank 11 is preferably cast from gray iron although aluminum MMC or any other suitable material may be used. The spacers 40 are preferably cast integrally with the first and second braking plates 20, and 30. Alternatively, the spacers may be formed separately, and adhesively bonded to the braking plates, or fastened to the braking plates with mechanical fasteners such as rivets or any other known fasteners. The spacers may also alternatively be fastened to the braking plates using press fits or staking, and adhesives may be used to strengthen these connections. Finally, the hat section 12 may be formed from a different material than the braking plates 20 and 30, and these components may be fastened together using known fastening techniques.

The rotor 10 also includes a plurality of duct tubes 50 disposed between the inner surfaces 24 and 34 of the braking plates 20 and 30 for providing a flow path for cooling air to move between the braking plates. The duct tubes 50 are preferably disposed around the entire circumference of the braking plates 20 and 30 at regularly spaced intervals. The duct tubes 50 are preferably formed from metal, such as tubular steel, copper, bronze or aluminum, although any suitable material including high temperature resistant plastic may be used.

The duct tubes 50 are preferably fastened to both of the braking plate inner surfaces 20 and 30 with a weld 51. The weld 51 may extend along the entire length of the duct tube or it may be spaced at intervals along the length of the duct tube. Alternatively, an adhesive, preferably a high temperature resistant adhesive may be used instead of the weld. The duct tubes 50 may alternatively be fastened to the braking plates 20, 30 using any other known fastening technique.

The duct tubes are preferably fastened in a manner providing a good conductive path for heat to flow from the braking plates 20, 30 to the duct tubes. The cooling air flowing through the duct tubes 50 removes this heat thus cooling the rotor. Alternatively, the duct tubes 50 may be fastened to only one of the braking plates 20 or 30. Additionally, the duct tubes 50 may be fastened to the spacers 40 alone, or the spacers and one or both braking plates using the fastening techniques described above.

Each duct tube 50 has an inlet 52 at the radially innermost end of the duct tube, and an outlet 54 at the radially outermost end of the duct tube. The cooling air flows through the ducts tubes 50 from the inlet 52 to the outlet 54 when the rotor turns. Each duct tube 50 also has a rounded cross section to reduce impediments to fluid flow. A rounded cross section may include a circular cross section, an elliptical cross section, an oval cross section, a rectangular cross section having round corners, or any other suitable cross sectional shape. The shapes and diameters of the inlets 52 of the duct tubes 50 may vary, additionally the shapes and diameters of the outlets 54 of the duct tubes 50 may vary.

Referring now to FIG. 2, a rotor 10 is illustrated showing different duct tubes 50 in accordance with the present invention. The duct tubes 50 may have various shapes. The duct tubes 50 are preferably curved as shown by the duct tubes 50a. The curved tubes 50a have a gradual curve along the length of the tubes, without forming sharp corners which would inhibit the airflow. The inlets 52 of the curved tubes 50a preferably form an angle A of approximately 45 degrees with the radius R of the rotor 10, although any suitable angle may be used. The outlets 54 of the curved tubes 50a preferably form an angle B of approximately 105 degrees with the tangent T to the rotor 10, although any suitable angle may be used.

The duct tubes 50 of the present invention may be tapered as shown by the duct tubes 50b, such that the diameter of the inlet 52 is different than the diameter of the outlet 54. The tapered duct tubes preferably have a larger outlet diameter than inlet diameter, although alternatively, the diameter of the inlet may be larger than the diameter of the outlet.

The duct tubes 50 may be straight rather than curved as shown by the duct tubes 50c. The straight tubes 50c may also be tapered as described above.

The rotor 10 preferably has uniform duct tubes 50 such that each tube is similar in size and shaped. Alternatively, the rotor 10 may include a combination of duct tubes 50 having different configurations.

The invention enables to the airflow characteristics between the braking plates of the universal rotor blank to be changed by using different duct tubes 50 of different shapes or configurations. Therefore, new universal rotor blanks will not have to be designed and casted. Rather, universal rotor blanks can be cast using a universal configuration of spacers 40 to which different ducts tubes can be fastened to achieve the desired airflow characteristics. This invention provides a greater degree of flexibility by using a universal rotor blank 11 for which the desired airflow characteristics can be achieved with a specific shape and configuration of duct tubes. Additionally, the shapes and configurations of the ducts 50 as well as the materials used for the ducts can be changed to adjust the efficiency of the heat transfer from the braking plates to the air. The efficiency of heat transfer will also determine the cooling effectiveness of the vented rotor 10.

Figure 3:
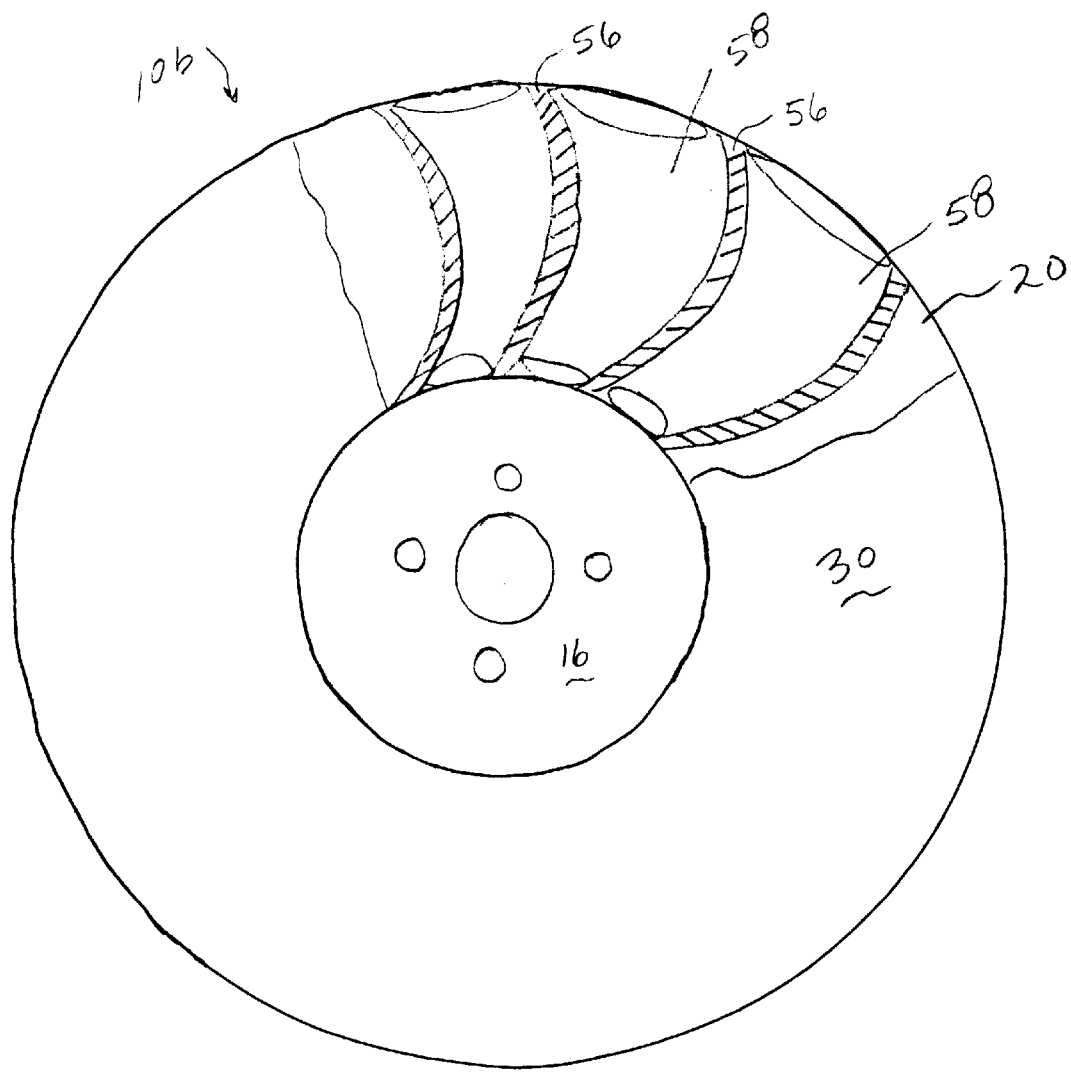
FIG. 3 is a perspective of the inner surface of the first braking plate and a plurality of duct tubes in accordance with the present invention.

Now referring to FIG. 3, an alternate embodiment of the rotor 10b is shown. The rotor includes a plurality of fins 56 instead of the posts 40. The fins 56 extend between the braking plate inner surfaces 24 and 34 to connect the braking plates 20 and 30 together in a similar manner as the posts described above. The fins 56 are preferably curved, although alternatively, the fins 56 may be straight. The duct tubes 58 are preferably similar to the tapered duct tubes 50b described above, although other shapes and configurations of ducts tubes may be used. The duct tubes are disposed between the fins 56 and are attached to the rotor 10b in a similar manner as described above.

Figure 4:
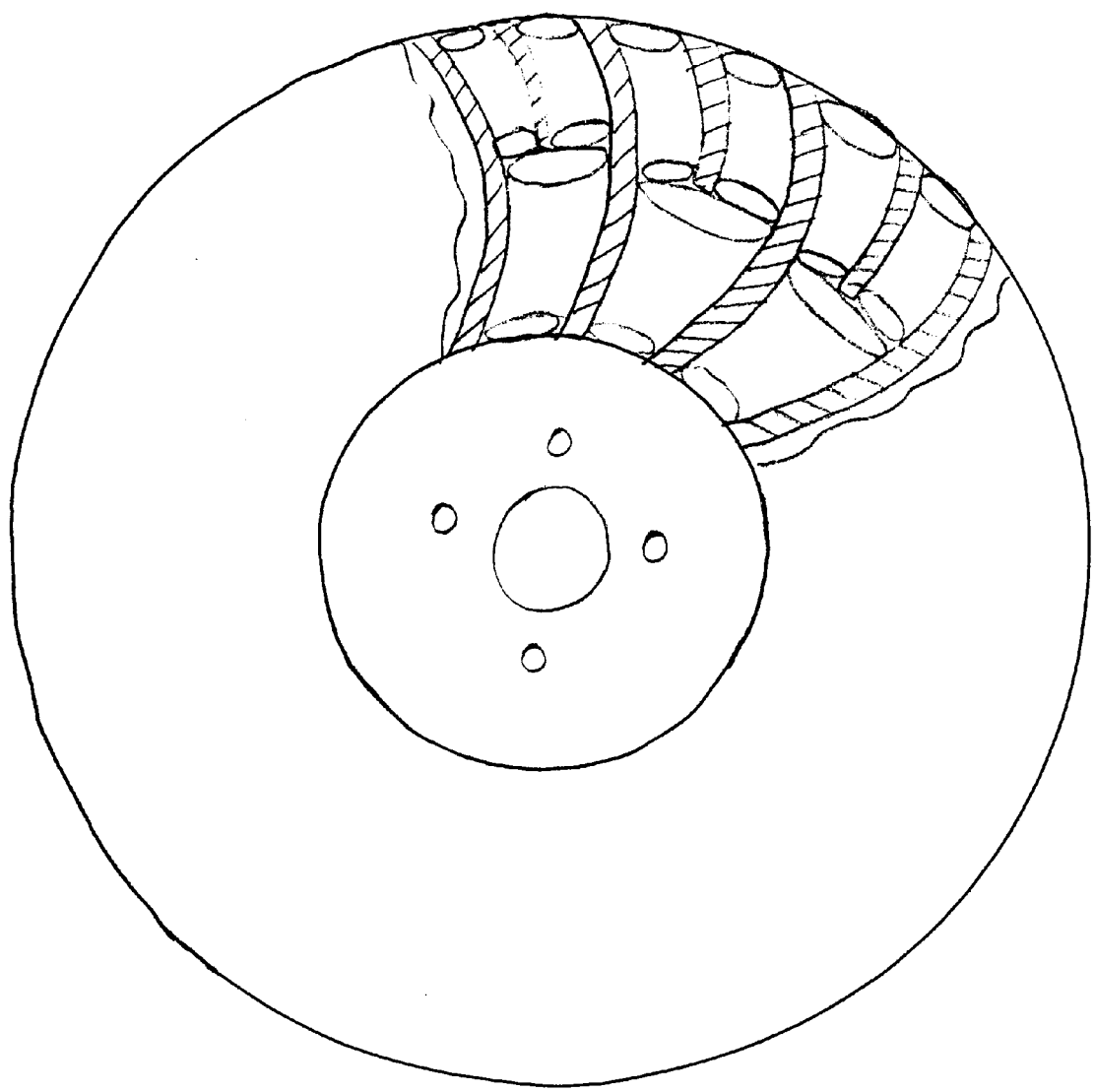
FIG. 4 is a perspective of the inner surface of the first braking plate with a plurality of fins and a plurality of duct tubes in accordance with the present invention.

A third alternate embodiment of the rotor 10c is illustrated in FIG. 4. The rotor 10c includes a second plurality of duct tubes (generally denoted as ) that vary in length from the first plurality of duct tubes 50. The second plurality of duct tubes 42 performs the same function as the first plurality of duct tubes 50. However, the second plurality of duct tubes 42 may use more than one duct tube in combination to form a vented portion from the hat section 12 to the outer edge 26.

As shown in FIG. 4., the vented portion of the rotor 10 may be formed by at least two duct tubes 42a and 42b in communication with each other. Individually, the length of each one of the second plurality of duct tubes 42 will not extend from the hat section 12 to the outer edge 26. The combination of the at least two of the second plurality of duct tubes 42a and 42b will form a passage way that extends from the inner end of the hat section 12 to the outer edge 26. This embodiment may be practiced with more than two duct tubes in combination.

The present invention further includes a method of forming a rotor of the type adapted for use in conjunction with a variety of braking devices, especially vehicle disc brake systems and the like. The method comprises the steps of initially forming a universal rotor blank similar to the universal rotor blank described above, preferably using a known casting technique, including a central hat section and peripheral section extending radially therefrom. The peripheral section includes first and second braking plates as described above. The universal rotor blank also includes a plurality of spacers, as described above, joining the first and second braking plates in the manner described above.

Tubular ducts similar to the ducts 50 described above are then fastened between the braking plates of the peripheral section for providing a flow path for cooling air to move between the braking plates when the rotor turns. The tubular ducts are fastened to the inner surface of the braking plates in a known manner such as welding, or the use of adhesives. The tubular ducts may also be fastened to the spacers as described above. The tubular ducts may have the shape and configuration described above.

In accordance with the provisions of the patent statutes, the present invention has been described in what is considered to represent its preferred embodiment, however it should be noted that the invention can be practiced otherwise than as specifically illustrated and described without departing from its spirit or scope.

What is claimed is:

1. A modular vented brake rotor comprising:
   a centrally disposed hat section for mounting the rotor to a vehicle;
   a first braking plate extending radially from said hat section having an annular outer braking surface and an inner surface;
   a second braking plate having an outer braking surface and an inner surface, said second braking plate being joined to said first braking plate in a mutually parallel, spaced apart relationship such that said inner surfaces face each other;
   a plurality of duct tubes disposed between said inner surfaces and fastened to at least one of said inner surfaces for providing passages for cooling air to travel between said first and second braking plates.

2. The vented brake rotor defined in claim 1 wherein said duct tubes are curved.

3. The vented brake rotor defined in claim 1 wherein at least one of said duct tubes is tapered.

4. The vented brake rotor defined in claim 1 wherein each one of said duct tubes has a rounded cross section.

5. The vented brake rotor defined in claim 1, further including a second plurality of duct tubes having different lengths than the first plurality of ducts tubes.

6. The vented brake rotor defined in claim 1, wherein the cross sectional area of each inlet of each respective one of said duct tubes is greater than the corresponding cross sectional area of the respective outlet of each one of said duct tubes.

7. The vented brake rotor defined in claim 1, wherein each one of said duct tubes is welded to at least one of said inner surfaces.

8. The vented brake rotor defined in claim 1, wherein each one of said duct tubes is glued to at least one of said inner surfaces.

9. A vented brake rotor comprising:
   a centrally disposed hat section for mounting the rotor to a vehicle;
   a first annular braking plate extending radially outwards from said hat section and having an outer braking surface and an inner surface;
   a second annular braking plate having an outer braking surface and an inner surface;
   a plurality of supports disposed between said inner surfaces of said first and second braking plates for joining said first and second braking plates together in a spaced apart relationship; and
   a plurality of duct tubes disposed between said first and second braking plates at regular spaced apart intervals.

10. The vented brake rotor defined in claim 9 wherein at least some of said duct tubes have a curved configuration.

11. The vented brake rotor defined in claim 9 wherein said duct tubes are replaceable.

12. The vented brake rotor defined in claim 9 wherein at least some of said duct tubes are tapered.

13. The vented brake rotor defined in claim 12 wherein said tapered duct tubes each have an inlet and an outlet, and the cross sectional area of the inlet is smaller than the cross sectional area of the outlet.

14. The vented brake rotor defined in claim 9 wherein said duct tubes have smooth inner walls.

15. The vented brake rotor defined in claim 9 further including a second plurality of duct tubes having different lengths than said first plurality of ducts tubes.

16. The vented brake rotor defined in claim 9 wherein each one of said duct tubes is welded to said inner surface of at least one of said first and second braking plates.

17. A method of manufacturing a vented brake rotor comprising the steps:

forming a universal rotor blank having a centrally disposed hat section and a peripheral section extending radially from the hat section, the peripheral section including a first braking plate extending radially from the hat section having an inner surface and a second braking plate having an inner surface, wherein the second braking plate is joined to the first braking plate in a mutually parallel, spaced apart relationship such that said inner surfaces face each other;

forming a plurality of duct tubes having inlets and outlet; and fastening the duct tubes between the braking plates and to the inner surface of at least one of said braking plates to allow air to flow through the duct tubes and between the braking plates when the completed rotor turns.

18. A method of manufacturing a vented brake rotor comprising the steps:

forming a universal rotor blank having a centrally disposed hat section and a peripheral section extending radially from the hat section, the peripheral section including a first braking plate extending radially from the hat section having an inner surface and a second braking plate having an inner surface, wherein the second braking plate is joined to the first braking plate in a mutually parallel, spaced apart relationship such that said inner surfaces face each other;

forming a plurality of duct tubes having inlets and outlet; and fastening the duct tubes at regular spaced apart intervals between the braking plates to allow air to flow through the duct tubes and between the braking plates when the completed rotor turns.

\* \* \* \* \*